(12) United States Patent
Schweid

(10) Patent No.: US 8,102,404 B2
(45) Date of Patent: Jan. 24, 2012

(54) METHOD AND SYSTEM OF CYCLICAL SCREEN ROTATION FOR NEAR UNITY SCALED PRINTER VIDEO DATA

(75) Inventor: Stuart Alan Schweid, Pittsford, NY (US)

(73) Assignee: Xerox Corporation, Norwalk, CT (US)

( * ) Notice: Subject to any disclaimer, the term of this patent is extended or adjusted under 35 U.S.C. 154(b) by 533 days.

(21) Appl. No.: 12/351,937

(22) Filed: Jan. 12, 2009

(65) Prior Publication Data

US 2010/0177115 A1    Jul. 15, 2010

(51) Int. Cl.
*G09G 5/02*    (2006.01)
(52) U.S. Cl. ........... 345/611; 345/613
(58) Field of Classification Search ........... 358/1.1, 358/3.21, 269, 256, 464; 382/299
See application file for complete search history.

(56) References Cited

U.S. PATENT DOCUMENTS

| | | | |
|---|---|---|---|
| 6,707,578 B1 * | 3/2004 | Bradburn | 358/3.07 |
| 2007/0146386 A1 * | 6/2007 | Loce et al. | 345/611 |

* cited by examiner

*Primary Examiner* — Aaron M Richer
*Assistant Examiner* — Weiming He
(74) *Attorney, Agent, or Firm* — Oliff & Berridge, PLC

(57) ABSTRACT

A method for enabling near unity scaling of printer video data to provide compensation for paper shrinkage caused during duplex printing. To achieve high quality image output, near neighbor interpolation may be used at very high resolutions. However, the insertion of extra interpolated subpixels may cause an edge transition to be shifted away from its original subpixel location with respect to an applied anti-aliasing rendering screen thereby causing ragged edges. The method aligns the edge position and the anti-aliasing rendering screen by applying a cyclical rotation of the screen.

10 Claims, 2 Drawing Sheets

METHOD AND SYSTEM OF CYCLICAL SCREEN ROTATION FOR NEAR UNITY SCALED PRINTER VIDEO DATA

BACKGROUND

The exemplary embodiments are directed to a method and system for near unity scaling of printer video data. More specifically, the exemplary embodiments are directed to a method and a system for applying permuted anti-aliasing rendering screens as a function of past scaling.

Where continuous tone imagery contains an infinite range of colors or grays, the halftone process reduces visual reproductions to a binary image that is printed with only one color of ink. This binary reproduction relies on a basic optical illusion—that these tiny halftone dots are blended into smooth tones by the human eye.

All halftoning uses a high frequency/low frequency dichotomy. Digital halftoning uses a raster image or bitmap within which each monochrome picture element or pixel may be on or off, ink or no ink. To emulate an input base pixel cell, a scaled digital halftone output pixel must contain groups of monochrome subpixels within the same-sized cell area. The fixed location and size of these monochrome pixels includes the high frequency/low frequency dichotomy of the halftone method. Clustered multi-pixel dots cannot "grow" incrementally but in jumps of one whole pixel. Additionally, the placement of that pixel is slightly off-center. In other words, the input and output pixel grids may become misaligned after scaling. Due to this misalignment, anti-aliasing rendering may produce jagged edges and/or satellite pixels when applied to gray edges, thereby resulting in significant image quality degradation.

SUMMARY

It would be advantageous to accommodate near unity scaling for electronic registration. In particular, it would be advantageous to account for misalignment of the input and output pixel grids after near unity scaling. Specifically, to provide compensation for paper shrinkage caused during duplex printing, near unity scaling may be performed. In order to achieve high image output quality, nearest neighbor interpolation is used; and usually at very high resolutions. The interpolation is typically performed in the output or sub-pixel space, which in systems with high addressability is an integer multiple of the input resolution (e.g. 4x). However, as an input image is scaled, the insertion of extra interpolated pixels can cause an edge transition to be shifted away from its original sub-pixel location with respect to the anti-aliasing rendering screen, causing ragged edges and/or satellite pixels.

To address these problems and accomplish the above-mentioned advantages among others, a method is disclosed for maintaining the alignment between the edge position and the anti-aliasing rendering screen by applying a cyclical rotation of the screen, i.e. applying a permutation to the screen that consists of a cyclical rotation equal to the number of subpixels introduced to the output image after scaling. The anti-alias rendering screen to which the cyclical rotation is applied is typically a single cell halftone; the screen repeats every input pixel. The method disclosed is only applicable for anti-alias or edge rendering screens, as standard halftone screens are not aligned to an input content and therefore do not require realignment after scaling. Specifically, a method for performing near unity scaling in high addressable image input systems is disclosed, wherein each input base pixel on an input grid corresponds to an output pixel on an output grid, each output pixel having subpixels, each input pixel associated with a tag, the method including scaling a base pixel associated with an edge tag wherein the base pixel corresponds to an output pixel having a plurality of subpixels, wherein the edge tag determines half-tone value and alignment of the in the plurality of subpixels of a corresponding pixel.

More particularly, a method for performing near unity scaling in high addressable input systems having image input resolutions of or about 600 spi and output resolutions of or about 2400 spi is disclosed, wherein each input base pixel on an input grid of the addressable input system is mapped to 16 subpixels of an output pixel on an output grid, each input base pixel having an associated tag, the method including scaling an input base pixel associated with the edge tag; and performing permutated anti-alias rendering half-tone screening in accordance with the associated edge tag and as a function of scaling. High addressable systems of varying resolutions are contemplated.

Exemplary embodiments are described herein with respect to systems where video input resolution is lower than output resolution, such as 600 spi from the digital front end ("DFE") being scaled up to 2400 spi for a Vertical Cavity Surface Emitting Laser ("VCSEL") raster output scanner ("ROS"). The embodiments are also described with respect to systems wherein the electronic scaling is applied in 8 bit/pixel prior to a half tone rendering step. However, it is envisioned that any systems that may incorporate the features of the method for near unity scaling of printer video data described herein are encompassed by the scope and spirit of the exemplary embodiments.

EMBODIMENTS

Figure 1:
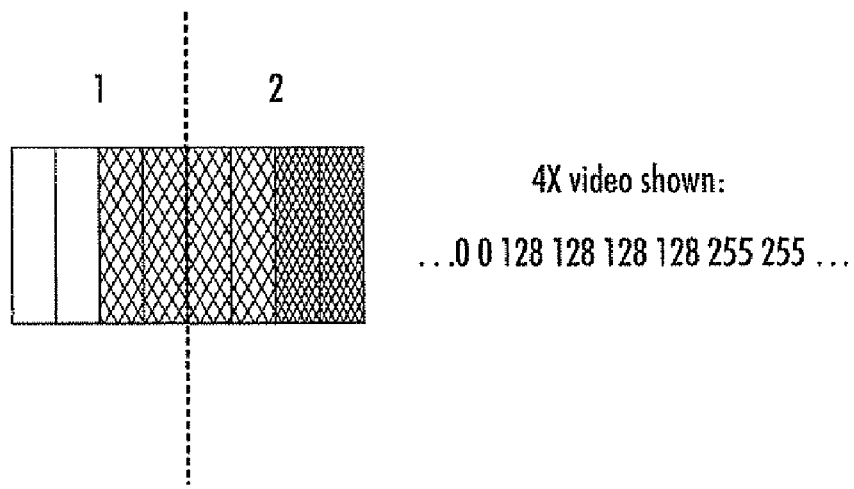
FIG. 1 is a diagrammatical view of a single pixel gray edge of the related art.

The exemplary embodiments are intended to cover all alternatives, modifications and equivalents as may be included within the spirit and scope of the devices, methods and systems as defined herein.

For an understanding of the method and system for near unity scaling in high addressable systems, reference is made to the drawings. In the drawings, like reference numerals have been used throughout to designate similar or identical elements. The drawings depict various embodiments of illustrative near unity scaling incorporating the features of the exemplary embodiments therein. As shown, the drawings diagrammatically depict the methods and systems with various features. In as much as the art of scaling and halftoning is well known, the methods and systems are diagrammatically shown herein and described with reference thereto.

In many image reproduction systems, e.g., printing systems, the output resolution and input resolution are different. Typically, the output resolution is higher than the input resolution. For example, VCSEL systems may have image input resolutions of 600 spi and printing resolutions of 2400 spi. Systems having an output resolution that is an integer multiple of the input resolution may be referred to as "high addressable" systems. These systems may employ one-to-many mapping—one input pixel maps to several output pixels. For example, if an input resolution is 600 spi and an output resolution is 2400 spi, each input pixel is expanded to 16 (4×4) output pixels after scaling. This may be referred to as 4× nearest neighbor scaling performed on the input contone image. Additionally, the process and cross process output resolution need not be identical. For example, the input resolution could be 300 spi and the output resolution could be 2400×1200. This would result in each input pixel expanded to 32 (8×4) output subpixels after scaling. The only requirement on the applicability of this method is that both the process and cross process output resolutions are integer multiples of the input resolution.

Nearest neighbor scaling (or nearest neighbor interpolation; point sampling; proximal interpolation) preserves image edges well, and may be instead of linear interpolation, which may cause ragged edges when used on text or line art. In some instances, image scaling may be desired in addition to applied resolution scaling. For example, scaling may be applied as a way to correct for paper shrinkage. In these cases, the combined scaling (image and resolution) may be expressed as $N+\Delta$, where N equals the ratio between the output resolution and the input resolution and $\Delta/N$ is the image scale factor. In cases where $\Delta$ is less than 1, the scaling algorithm may be especially simple; every pixel is replicated either N or N+1 times, in a ratio of $(1-\Delta)$ and $\Delta$, respectively.

For convenience, it is commonly known that pixels are arranged in a regular two-dimensional grid. By using such an arrangement, many common operations can be implemented by uniformly applying the same operation to each pixel independently. In the methods and systems described herein, the input pixels, or base pixels, may be aligned on an input grid; the output pixels may be aligned on an output grid. The output pixels may include a number of subpixels inserted or expanded after interpolation or scaling. Typically, a base pixel of the input grid should align with a corresponding output pixel of the output grid including interpolated subpixels.

Each pixel may be associated with a tag. A tag contains metadata that can either classify the pixel into a particular group and/or control processing of the particular pixel. Unlike contone values, which are continuous, tag values are discrete. A tag value of "19" is not halfway between tag "18," and "20." Because tags are discrete, only nearest neighbor interpolation may be used for tag interpolation. Tags may be used, for example, to indicate to a system that a pixel is an "edge" pixel, or part of the edge transition of an image such as typeface. Insertion of extra interpolated subpixels after scaling can cause an edge transition to shift away from its original subpixel location, i.e. the base pixel on the input grid would then be misaligned with the corresponding output pixel with subpixels such that, for example, the edge transition straddles two output pixel values. This problem may arise when a tag value such as an edge tag is used to select a halftone screen for rendering, and specifically anti-aliasing rendering. In particular, the misalignment problem may occur with anti-aliasing rendering screens because they are single cell halftones; they may apply to a single video value. They must be shifted to remain aligned with the edges that are being rendered. If not, they may create the compact edges that the AAR screens are intended to produce.

FIG. 1 shows a single pixel gray edge in 600 spi contone that be scaled up 4× (fast scan only for demonstration purposes) for the output resolution. The gray edge with 50% coverage is shown straddling a first pixel value 1 and a second pixel value 2 on the output grid. In other words, a halftone value associated with a single base pixel straddles output pixel 1 and output pixel 2. This is due to a shift in location resulting from the insertion of additional subpixels during scaling. The gray edge has a tag associated with it that calls for right biased AAR rendering. Other edge tags may require, for example, left biased rendering if better suited to the particular edge being rendered.

Figure 2:
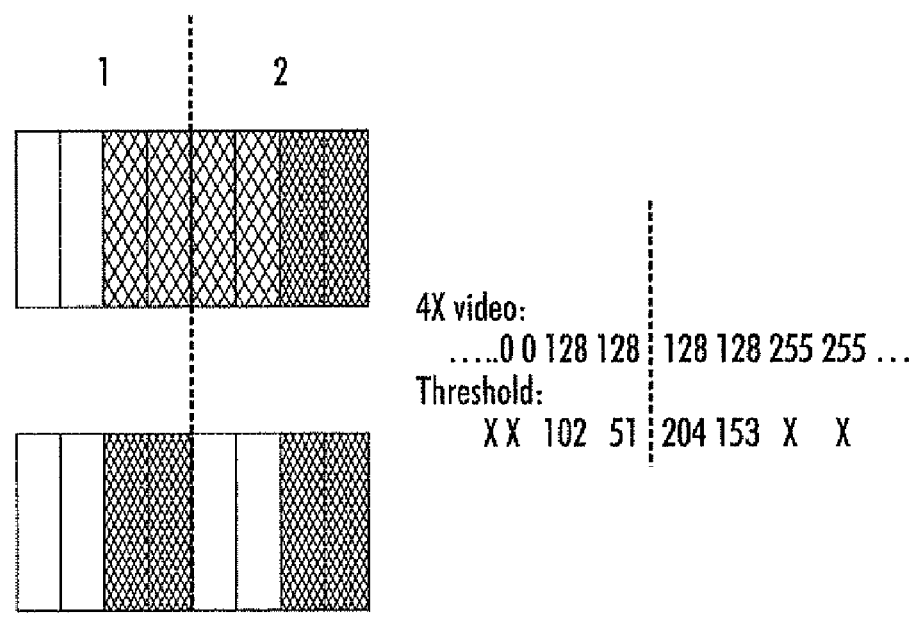
FIG. 2 is a diagrammatical view of a single pixel gray edge after scaling and AAR screening.
Figure 3:
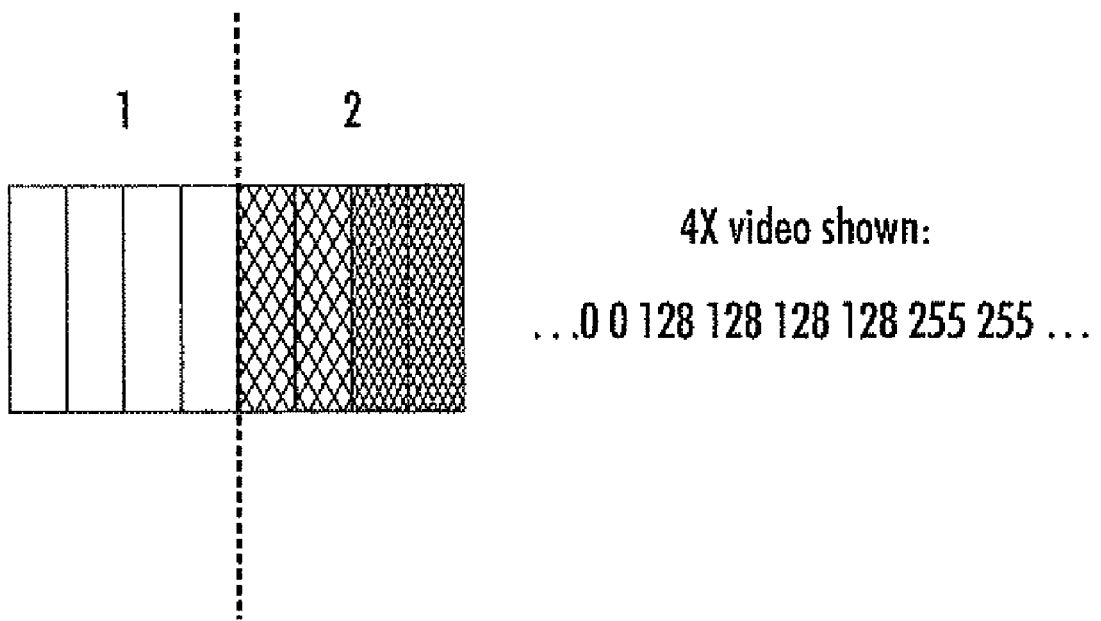
FIG. 3 is a diagrammatical view of a single pixel gray edge after scaling and permuted AAR screening.

FIG. 2 shows the output binary pattern resulting from applying a right biased AAR screen (thresholds: [204 153 102 51] for all four of the gray subpixels aligned to the output screen to the scaled pixels of FIG. 2. Application of the right biased screen may result in a satellite subpixel and may break up the edge to be rendered. This misalignment of the input and output pixel grids may cause a black-white, black-white pattern, rather than a sharp black to white transition—the right, left, top, or bottom biasing required by a particular edge tag loses meaning. The screen may be permuted, however, to realign the halftone cells made for a particular output pixel value with that intended pixel value.

To produce a clean edge, the AAR screen needs to be shifted to account for the gray edge being shifted ½ an output pixel value to straddle output pixels 1 and 2. This will realign the screen with the edge pixel. In FIG. 2, the AAR screen needs to be permuted from [204 153 102 51] to [102 51 204 153]. The permutation required is a cyclical rotation of two. The permutation consists of a cyclical right shift equal to the number of subpixels introduced to the output image due to scaling. The number of subpixels added from scaling represents the shift between the input and the output resolutions, which the permutation accounts for.

Similarly, a permutation in the left direction may be required. Or, a permutation in the up-down direction may account for subscanlines introduced by scaling. The method may be used in the fastscan/cross process direction. The order of permuting does not affect the outcome, so it is possible to permute first for the process direction and then for the cross process direction.

Generally, an AAR screen may expressed as N×M, where N is the ratio of the output to input resolutions in the process direction and M is the ratio of the output to input resolutions in the cross process direction. The permuted AAR screen may be found from the following MATLAB program:

```
for i = 0:N−1, for k = 0:M−1,
    inew = i+ process_subscanlines_added;
    inew = rem(inew, N);
    knew = k + cross_subpixels_added;
    knew=rem(knew,M);
    AAR_Permute(inew+1, knew+1) = AAR(i+1, k+1);
end; end
```

In systems where memory is inexpensive and computing time is critical, all possible permuted forms of an AAR screen may be precalculated and stored. Alternatively, permuted screens may be formed in real time in systems where memory is at a premium and logic is inexpensive.

It will be appreciated that various of the above-disclosed and other features and functions, or alternatives thereof, may be desirably combined into many other different systems or applications. Also, various presently unforeseen or unanticipated alternatives, modifications, variations or improvements therein may be subsequently made by those skilled in the art, and are also intended to be encompassed by the following claims.

What is claimed is:

1. A method for performing near unity scaling in high addressable input systems, wherein each input base pixel, which is arranged on an input grid of the addressable input system, is mapped to N×M subpixels of an output pixel, which is arranged on an output grid, each input base pixel having an associated tag, wherein at least one input base pixel is associated with an edge tag, the method comprising:

scaling an input base pixel associated with the edge tag; and performing halftone screening in accordance with the associated edge tag and as a function of scaling, wherein
the halftone screening is conducted using an anti-alias rendering screen, and
the anti-alias rendering screen is permuted by shifting threshold values as a function of the degree of scaling.

2. The method for performing near unity scaling in high addressable input systems of claim 1, wherein the degree of scaling includes the amount of subpixels added by interpolation to the output pixel.

3. The method for performing near unity scaling in high addressable input systems of claim 1, wherein the shifting of threshold values is a cyclical rotation.

4. A method for performing near unity scaling in high addressable input systems, wherein each input base pixel on an input grid corresponds to an output pixel on an output grid, each output pixel having N×M subpixels, and each input pixel having an associated tag, the method comprising:

performing nearest neighbor scaling on a base pixel associated with an edge tag whereby the base pixel is scaled to N×M subpixels, wherein a first portion of the subpixels are a portion of a first output pixel, and a second portion of the subpixels are a portion of a second and adjacent output pixel; and applying halftone screening to align base pixel half-tone values in accordance with an edge tag with corresponding output pixel subpixels to ensure that the N×M subpixels correspond to a single output pixel, wherein
the halftone screening is conducted using a permuted anti-alias rendering screen, and
the anti-alias rendering screen is permitted by shifting threshold values as a function of the degree of scaling.

5. The method for performing near unity scaling in high addressable input systems of claim 4, wherein each input base pixel on an input grid corresponds to an output pixel on an output grid, each output pixel having N×M subpixels, and each input pixel having an associated tag, wherein the anti-alias rendering screen is permuted as a function of the number of subpixels added to the output pixel after interpolation by scaling.

6. The method for performing near unity scaling in high addressable input systems of claim 4, wherein the shifting of threshold values is a cyclical rotation.

7. A method for performing near unity scaling in high addressable image input systems wherein each input base pixel on an input grid corresponds to an output pixel on an output grid, each output pixel having a plurality of subpixels, at least one input pixel associated with an edge tag, the method comprising:

scaling the base pixel associated with the edge tag wherein the base pixel corresponds to the output pixel having a plurality of subpixels, the plurality of subpixels being added by interpolation after scaling; and applying a half-tone screen, wherein the edge tag determines half-tone value and alignment of the tone value in each of the plurality of subpixels of a corresponding output pixel, wherein the output grid and input grid are aligned after screening, and the output grid and input grid are aligned by permuting the halftone screen by shifting threshold values as a function of the number of added interpolated subpixels due to scaling.

8. The method for performing near unity scaling in high addressable image input systems of claim 7, wherein the shifting of threshold values is a cyclical rotation.

9. A system for performing near unity scaling in high addressable image input systems wherein each input base pixel on an input grid corresponds to an output pixel on an output grid, each output pixel having a plurality of subpixels, at least one input pixel associated with an edge tag, the system comprising:

scaling the input pixel associated with the edge tag whereby the base pixel corresponds to an output pixel having a plurality of subpixels, the plurality of subpixels being added by interpolation after scaling; and applying a halftone screen, wherein the edge tag determines half-tone value and alignment of the tone value in each of the plurality of subpixels of a corresponding output pixel, wherein the output grid and input grid are aligned after screening, and the screen is permuted by shifting threshold values in accordance with an anti-aliasing rendering screen permutation program recorded on a computer readable medium.

10. The system for performing near unity scaling in high addressable image input systems of claim 9, wherein the shifting of threshold values is a cyclical rotation.

* * * * *